(12) United States Patent
Jung et al.

(10) Patent No.: US 9,778,521 B2
(45) Date of Patent: Oct. 3, 2017

(54) DISPLAY APPARATUS

(71) Applicant: Samsung Display Co., Ltd., Yongin, Gyeonggi-Do (KR)

(72) Inventors: Hyunggi Jung, Cheonan-si (KR); Younggoo Song, Asan-si (KR); Kipyo Hong, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 347 days.

(21) Appl. No.: 14/284,750

(22) Filed: May 22, 2014

(65) Prior Publication Data

US 2015/0168772 A1 Jun. 18, 2015

(30) Foreign Application Priority Data

Dec. 17, 2013 (KR) .................. 10-2013-0157372

(51) Int. Cl.
*G02F 1/1333* (2006.01)
*G02F 1/1362* (2006.01)
*G02F 1/1339* (2006.01)

(52) U.S. Cl.
CPC .... *G02F 1/136209* (2013.01); *G02F 1/13394* (2013.01); *G02F 2001/136218* (2013.01); *G02F 2001/136222* (2013.01)

(58) Field of Classification Search
None
See application file for complete search history.

(56) References Cited

U.S. PATENT DOCUMENTS

| 6,356,330 B1 | 3/2002 | Ando et al. | |
| 6,704,068 B2 | 3/2004 | Murade | |
| 8,546,180 B2 * | 10/2013 | Yamazaki | H01L 27/1214 438/104 |
| 2001/0030722 A1 | 10/2001 | Murade | |
| 2005/0140858 A1 * | 6/2005 | Park | G02F 1/13394 349/110 |
| 2006/0250537 A1 * | 11/2006 | Lee | G02F 1/13624 349/43 |

(Continued)

FOREIGN PATENT DOCUMENTS

| JP | 2002-196349 | 7/2002 |
| JP | 2007-334082 | 12/2007 |

(Continued)

*Primary Examiner* — Richard Kim
(74) *Attorney, Agent, or Firm* — Innovation Counsel LLP

(57) ABSTRACT

A display apparatus includes pixels. Each pixel includes a first pixel electrode, a second pixel electrode, a black matrix, a shielding electrode, and first and second sub-shielding electrodes. The first pixel electrode is disposed in a first pixel area. The second pixel electrode is disposed in a second pixel area. The black matrix is disposed in a predetermined area of a first boundary area between the first pixel area and the second pixel area. The shielding electrode is disposed between first pixel areas and between second pixel areas, which are arranged in a first direction, and extends in a second direction crossing the first direction. The first and second sub-shielding electrodes branch from the shielding electrode along the first direction and are spaced apart from each other in the first boundary area while the black matrix is disposed therebetween.

20 Claims, 7 Drawing Sheets

(56) References Cited

U.S. PATENT DOCUMENTS

| | | | | |
|---|---|---|---|---|
| 2010/0315569 | A1* | 12/2010 | Lin | G02F 1/136209 349/43 |
| 2012/0105785 | A1* | 5/2012 | Kim | G09G 3/3648 349/139 |
| 2012/0281173 | A1* | 11/2012 | Kwon | G02F 1/133707 349/123 |
| 2013/0329155 | A1* | 12/2013 | Kwak | G02F 1/136 349/43 |
| 2014/0098315 | A1* | 4/2014 | Jung | G02F 1/1368 349/42 |

FOREIGN PATENT DOCUMENTS

| | | |
|---|---|---|
| KR | 1020080010145 A | 1/2008 |
| KR | 1020100066219 A | 6/2010 |
| KR | 1020110054727 A | 5/2011 |
| KR | 1020110068271 A | 6/2011 |
| KR | 1020120120761 A | 11/2012 |
| KR | 1020130034744 A | 4/2013 |

* cited by examiner

DISPLAY APPARATUS

CROSS-REFERENCE TO RELATED APPLICATION

This U.S. non-provisional patent application claims priority under 35 U.S.C. §119 of Korean Patent Application No. 10-2013-0157372, filed on Dec. 17, 2013, the contents of which are hereby incorporated by reference in its entirety.

BACKGROUND

1. Field of Disclosure

The present disclosure relates to a display apparatus having improved reliability by decreasing an area for a black matrix.

2. Description of the Related Art

In recent years, various display devices, such as a liquid crystal display, an organic light emitting display, an electrowetting display, an electrophoretic display, a nano-crystal display, etc., have been developed.

Among them, a liquid crystal display includes a first substrate, a second substrate facing the first substrate, and a liquid crystal layer interposed between the first substrate and the second substrate. The first substrate includes a plurality of pixel electrodes to drive the liquid crystal layer. The second substrate includes a common electrode.

An electric field is formed between the pixel electrodes and the common electrode by a data voltage applied to the pixel electrode and a common voltage applied to the common electrode. Liquid crystal molecules of the liquid crystal layer are realigned by the electric field formed between the pixel electrode and the common electrode and an amount of light passing through the liquid crystal layer is controlled, thereby displaying a desired image.

SUMMARY

The present disclosure provides a display apparatus having improved reliability by decreasing an area for a black matrix.

Embodiments of the inventive concept provide a display apparatus including a display panel that includes gate lines, data lines, and pixels connected to the gate lines and the data lines. Each pixel includes a first pixel electrode, a second pixel electrode, a black matrix, a shielding electrode, and first and second sub-shielding electrodes. The first pixel electrode is disposed in a first pixel area. The second pixel electrode is disposed in a second pixel area. The black matrix is disposed in a predetermined area of a first boundary area between the first pixel area and the second pixel area. The shielding electrode is disposed between first pixel areas and between second pixel areas, which are arranged in a first direction, and extends in a second direction crossing the first direction. The first and second sub-shielding electrodes branch from the shielding electrode along the first direction and are spaced apart from each other in the first boundary area while the black matrix is disposed therebetween.

Each of the data lines is disposed in a second boundary area in which the shielding electrode is disposed and the shielding electrode has a width greater than a width of each of the data lines in the second direction.

Each of the pixels further includes a first transistor connected to a corresponding gate line of the gate lines, a corresponding data line of the data lines, and the first pixel electrode, a second transistor connected to the corresponding gate line, the corresponding data line, and the second pixel electrode, and a third transistor connected to the corresponding gate line, the second pixel electrode, and a storage line disposed on a same layer as the corresponding data line. The first, second, and third transistors are disposed in the first boundary area.

The display panel includes a plurality of color filters disposed on the first, second, and third transistors and extending in the second direction overlap with the first and second pixel areas and an insulating layer disposed an the shielding electrode and the first and second sub-shielding electrodes. The shielding electrode and the first and second sub-shielding electrodes are disposed on the color filters, and the first and second pixel electrodes and the black matrix are disposed on the insulating layer.

The first transistor includes a first gate electrode branched from the corresponding gate line, a first source electrode branched from the corresponding data line, and a first drain electrode connected to a first connection electrode branched from the first pixel electrode through a first contact hole formed through the insulating layer and the color filter. The first sub-shielding electrode extends to be adjacent to the first contact hole and is disposed not to overlap with the first connection electrode, and an end of the first sub-shielding electrode in the first direction is substantially parallel to the second direction.

The second transistor includes a second gate electrode branched from the corresponding gate line, a second source electrode branched from the corresponding data line, and a second drain electrode connected to a second connection electrode branched from the second pixel electrode through a second contact hole formed through the insulating layer and the color filter. The second sub-shielding electrode extends to be adjacent to the second contact hole and is disposed not to overlap with the second connection electrode, and an end of the second sub-shielding electrode in the first direction is substantially parallel to the second direction.

The storage line extends in the second direction to overlap with a center portion of the first pixel electrode and a center portion of the second pixel electrode, and extends in the second direction in the first boundary area after extending in the second direction in a boundary between the first pixel area and the first boundary area and in a boundary between the second pixel area and the first boundary area by a predetermined length.

The third transistor includes a third gate electrode branched from the corresponding gate line, a third source electrode branched from the storage line, and a third drain electrode connected to the second pixel electrode through the second contact hole.

Embodiments of the inventive concept provide a display apparatus including a display panel that includes gate lines, data lines, and pixels connected to the gate lines and the data lines. Each pixel includes a first pixel electrode, a second pixel electrode, a first transistor, a second transistor, a third transistor, a shielding electrode, and a black matrix. The first pixel electrode is disposed in a first pixel area. The second pixel electrode is disposed in a second pixel area. The first transistor is connected to a corresponding gate line of the gate lines, a corresponding data line of the data lines, and the first pixel electrode. The second transistor is connected to the corresponding gate line, the corresponding data line, and the second pixel electrode. The third transistor is connected to the corresponding gate line, the second pixel electrode, and a storage line disposed on a same layer as the corresponding data line. The shielding electrode is disposed between first pixel areas and between second pixel areas, which are arranged in a first direction, and extends in a second direction crossing the first direction. The black matrix is selectively disposed in a predetermined area of a first boundary area between the first pixel area and the second pixel area. The first, second, and third transistors are disposed in the first boundary area.

According to the above, the area for the black matrix is reduced in the display apparatus, and thus the display reliability of the display apparatus may be improved.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
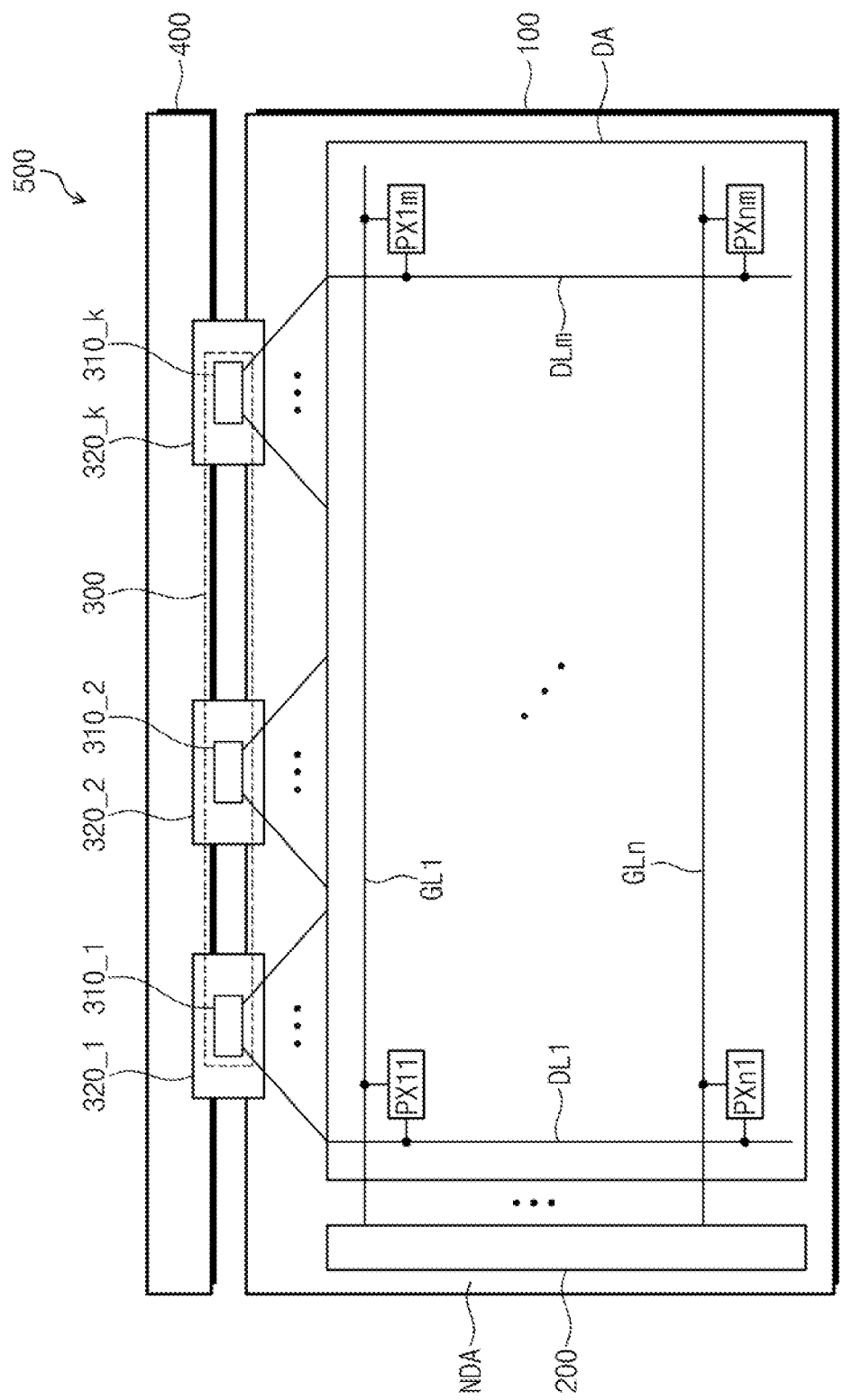
FIG. 1 is as plan view showing a display apparatus according to a first exemplary embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "above", "upper" and the like, may be used herein for ease of description to describe one element or features relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms, "a", "an" and "the" are intended to include the plural forms as well, unless the context clearly indicates otherwise. It will be further understood that the terms "includes" and/or "including", when used in this specification, specify the presence of stated features, integers steps, operations, elements, and/or components, but do not preclude the presence or addition of one or more other features, integers, steps, operations, elements, components, and for groups thereof.

Unless otherwise defined, all terms (including technical and scientific terms) used herein have the same meaning as commonly understood by one of ordinary skill in the art to which this application belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments will be explained in detail with reference to the accompanying drawings.

FIG. 1 is a plan view showing a display apparatus according to a first exemplary embodiment of the present disclosure.

Referring to FIG. 1, a display apparatus 500 includes a display panel 100, a gate driver 200, at data driver 300, and a driving circuit board 400.

The display panel 100 includes a plurality of pixels PX11 to PXnm, at plurality of gate lines GL1 to GLn, and a plurality of data lines DL1 to DLm. The display panel 100 includes a display area DA and a non-display area NDA surrounding the display area DA when viewed in a plan view.

The pixels PX11 to PXnm are disposed in the display area DA and arranged in a matrix form. For instance, the pixels PX11 to PXnm are arranged in n rows by m columns crossing the rows. Each of "m" and "n" is an integer number larger than zero (0).

The data lines DL1 to DLm are insulated from the gate lines GL1 to GLn and disposed to cross the gate lines GL1 to GLn. The gate lines GL1 to GLn are connected to the gate driver 200 to sequentially receive gate signals. The data lines DL1 to DLm are connected to the data driver 300 to receive data voltages in analog form.

Each of the pixels PX11 to PXnm is connected to a corresponding gate line of the gate lines GL1 to GLn and a corresponding data line of the data lines DL1 to DLm. The pixels PX11 to PXnm receive the data voltages through the data lines DL1 to DLm in response to the gate signals provided through the gate lines GL1 to GLn. The pixels PX11 to PXnm display gray scales corresponding to the data voltages.

The gate driver 200 generates the gate signals in response to a gate control signal provided from a timing controller (not shown) mounted on the driving circuit board 400. The gate signals are sequentially applied to the pixels PX11 to PXnm through the gate lines GL1 to GLn in the unit of row. As a result, the pixels PX11 to PXnm are driven in the unit of row.

The gate driver 200 is disposed in the non-display area NDA disposed adjacent to a left side of the display area DA. The gate driver 200 may be mounted on the non-display area NDA adjacent to the left side of the display area DA in the form of amorphous silicon TFT gate driver circuit (ASG), but it should not be limited thereto or thereby.

That is, the gate driver 200 may include a plurality of gate driving chips. The gate driving chips may be mounted on the non-display area NDA adjacent to the left side of the display area DA in a chip on glass (COG) scheme or connected to the non-display area NDA adjacent to the left side of the display area DA in a tape carrier package (TCP).

The data driver 300 receives image signals and a data control signal from the timing controller. The data driver 300 generates the analog data voltages corresponding to the image signals in response to the data control signal. The data driver 300 applies the data voltages to the pixels PX11 to PXnm through the data lines DL1 to DLm.

The data driver 300 includes a plurality of source driving chips 310_1 to 310_k. Here, "k" is an integer number larger than zero (0) and smaller than "m". The source driving chips 310_1 to 310_k are mounted on flexible printed circuit boards 320_1 to 320_k, respectively, and connected between the driving circuit board 400 and the non-display area NDA adjacent to an upper side of the display area DA.

However, the source driving chips 310_1 to 310_k may be mounted on the non-display area NDA adjacent to the upper side of the display area DA in the COG scheme.

Figure 2:
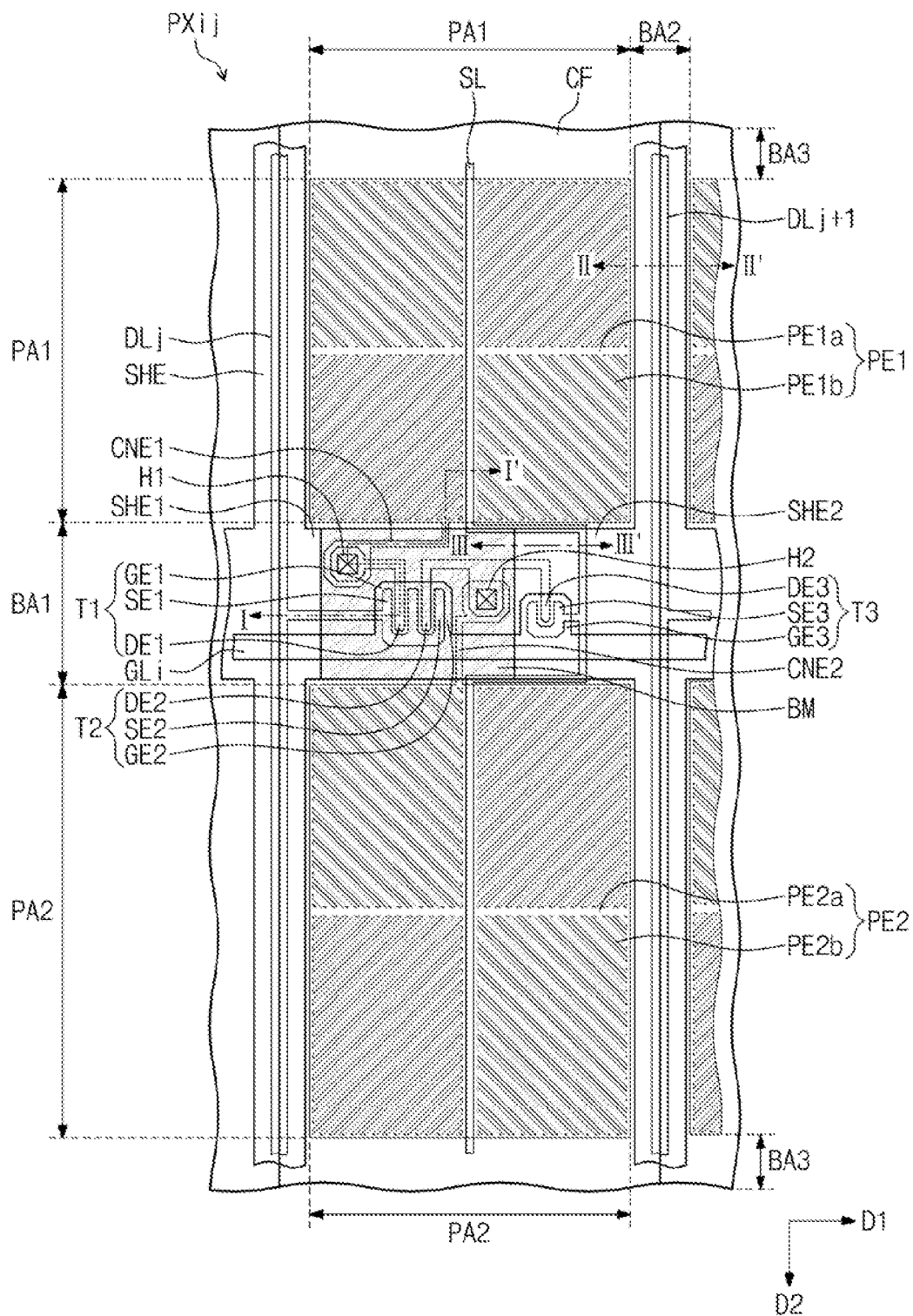
FIG. 2 is a layout diagram showing a pixel shown in FIG. 1.

FIG. 2 is a layout diagram showing a pixel shown in FIG. 1.

FIG. 2 shows only one pixel PXij, but the pixels shown in FIG. 1 have the same structure and function. Accordingly, for the convenience of explanation, a configuration of only one pixel PXij will be described in detail.

Referring to FIG. 2, the pixel PXij is connected to the corresponding gate line GLi and the corresponding data fine DLj. The gate line GLi extends in a first direction D1. The data line DLj extends in a second direction D2 crossing the first direction D1. The first direction D1 corresponds to a row direction and the second direction D2 corresponds to a column direction.

The pixel PXij includes a first sub-pixel and a second sub-pixel. The first sub-pixel includes a first transistor T1 and a first pixel electrode PE1. The second sub-pixel includes a second transistor T2, a third transistor T3, and a second pixel electrode PE2.

An area of the first sub-pixel, in which an image is displayed, is referred to as a first pixel area PA1 and an area of the second sub-pixel, in which the image is displayed, is referred to as a second pixel area PA2. The first pixel electrode PE1 is disposed in the first pixel area PA1 and the second pixel electrode PE2 is disposed in the second pixel area PA2.

An area between the first and second pixel areas PA1 and PA2 of the pixel PXij is referred to as a first boundary area BA1. The first boundary area BA1 extends in the first direction D1. The gate line GLi and the first, second, and third transistors T1, T2, and T3 are disposed in the first boundary area BA1.

The area between the pixels includes a second boundary area BA2 and a third boundary area BA3. The second boundary area BA2 is disposed between the pixels arranged in the first direction D1 and extends in the second direction D2. In detail, the second boundary area BA2 is disposed between the first pixel areas PA1 arranged in the first direction D1 and between the second pixel areas PA2 arranged in the first direction D1 and extends in the second direction D2. The data lines DLj and DLj+1 are disposed in the second boundary area BA2.

The third boundary area BA3 is disposed between the pixels arranged in the second direction D2 and extends in the first direction D1. For instance, the third boundary area BA3 is disposed between the first pixel area PA1 of the pixel PXij and the second pixel area PA2 of another pixel adjacent to the pixel PXij and extends in the first direction D1.

The first boundary area BA1 may cross the second boundary area BA2. The gate line GLi crosses the data lines DLj and DLj-+1 in the cross area in which the first boundary area BA1 crosses the second boundary area BA2.

The first transistor T1 of the first sub-pixel includes a first gate electrode GE1 branched from the gate line GLi, a first source electrode SE1 branched from the data line DLj, and a first drain electrode DE1 connected to the first pixel electrode PE1. The first drain electrode DE1 extends and electrically makes contact with a first connection electrode CNE1 branched from the first pixel electrode PE1 through a first contact hole H1.

The second transistor T2 of the second sub-pixel includes a second gate electrode GE2 branched from the gate line GLi, a second source electrode SE2 branched from the data line DLj, and a second drain electrode DE2 connected to the second pixel electrode PE2. The second drain electrode DE2 extends and electrically makes contact with a second connection electrode CNE2 branched from the second pixel electrode PE2 through a second contact hole H2.

The third transistor T3 of the second sub-pixel includes a third gate electrode GE3 branched from the gate line GLi, a third source electrode SE3 branched from a storage line SL, and a third drain electrode DE3 connected to the second pixel electrode PE2. The third drain electrode DE3 extends from the second drain electrode DE2. The third drain electrode DE3 extends and electrically makes contact with the second connection electrode CNE2 branched from the second pixel electrode PE2 through the second contact hole H2.

The storage line SL extends in the second direction D2 to overlap with a center portion of the first pixel electrode PE1 and a center portion of the second pixel electrode PE2. In addition, the storage line SL extends in the second direction D2 by a predetermined length in the boundary between the first pixel area PA1 and the first boundary area BA1 and between the second pixel area PA2 and the first boundary area BA1, and then extends in the second direction D2 in the first boundary area BA1. The storage line SL is disposed on the same layer as the data lines DLj and DLj+1 and applied with a storage voltage.

A plurality of color filters CF extending in the second direction D2 is disposed in the display area DA. The color filters CF are overlapped with the pixels arranged in the second direction D2. In detail, each of the color filters CF is disposed to overlap with the first and second pixel areas PA1 and PA2 arranged in the second direction D2. The color filters CF are disposed to be adjacent to each other in the first direction D1, and thus the color filters CF may make contact with each other. For example, the color filters CF may be disposed to make contact with each other in the second boundary area BA2.

The first pixel electrode PE1 includes a first trunk portion PE1*a* and a plurality of first branch portions PE1*b* extending from the first trunk portion PE1*a* in a radial form. The first trunk portion PE1*a* may have various shapes. In the present exemplary embodiment, the first trunk portion PE1a may have a cross shape as shown in FIG. 2. In this case, the first pixel area PA1 of the pixel PXij is divided into four domains by the first trunk portion PE1a.

A portion of the cross shape of the first trunk portion PE1a in the first pixel area PA1, which extends in the second direction D2, is overlapped with the storage line SL.

The first branch portions PE1b extend in different directions according to each domain. The first branch portions PE1b extend substantially in parallel to each other and are spaced apart from each other in each domain divided by the first trunk portion PE1a. A distance between two adjacent first branch portions PE1b to each other is measured in terms of a micrometer, and a plurality of micro-slits is formed.

The display panel 100 includes a liquid crystal layer disposed between two substrates facing each other. Liquid crystal molecules of the liquid crystal layer are pretilted in different directions in the first pixel area PA1 in each domain due to the micro-slits. Accordingly, four domains in which the liquid crystal molecules are aligned in different directions are formed in the liquid crystal layer. As described above, when the liquid crystal molecules are aligned in various directions, a reference viewing angle of the display apparatus 100 including the liquid crystal layer may be enhanced.

The first pixel electrode PE1 includes a transparent conductive material, e.g., indium tin oxide (ITO), indium zinc oxide (IZO), indium tin zinc oxide (ITZO), etc.

The second pixel electrode PE2 includes a second trunk portion PE2a and a plurality of second branch portions PE2b extending from the second trunk portion PE2a in a radial form. A portion of the cross shape of the second trunk portion PE2a in the second pixel area PA2, which extends in the second direction D2, is overlapped with the storage line SL.

The second pixel electrode PE2 has an area greater than an area of the first pixel electrode PE1 when viewed in a plan view. The second pixel electrode PE2 has the same shape as that of the first pixel electrode PE1 except for the area. In addition, the second pixel electrode PE2 may include the same material as that of the first pixel electrode PE1. Therefore, detailed description of the second pixel electrode PE2 will be omitted.

A shielding electrode SHE is disposed in the second boundary area BA2 and extends in the second direction D2. The shielding electrode SHE has a width greater than that of each of the data lines DLj and DLj+1 in the first direction D1. The shielding electrode SHE is disposed to overlap with the second boundary area BA2. The shielding electrode SHE blocks the light passing through the second boundary area BA2.

The shielding electrode SHE includes the same material as that of the pixel electrodes PE1 and/or PE2. That is, the shielding electrode SHE includes a transparent conductive material, e.g., indium tin oxide, indium zinc oxide, indium tin zinc oxide, etc.

A first sub-shielding electrode SHE1 and a second sub-shielding electrode SHE2, which are branched from the shielding electrode SHE to the first direction D1, are disposed in the first boundary area BA1.

The first sub-shielding electrode SHE1 is disposed to be adjacent to the first contact hole H1. In addition, the first sub-shielding electrode SHE1 is disposed not to overlap with the first connection electrode CNE1. An end of the first sub-shielding electrode SHE1 is formed to be vertical to the first direction D1. That is, the end of the first sub-shielding, electrode SHE1 is formed to be substantially parallel to the second direction D2 in the first direction D1.

The second sub-shielding electrode SHE2 is disposed to be adjacent to the second contact hole H2. In addition, the second sub-shielding electrode SHE2 is disposed not to overlap with the second connection electrode CNE2. An end of the second sub-shielding electrode SHE2 is formed to be vertical to the first direction D1. That is, the end of the second sub-shielding electrode SHE2 is formed to be substantially parallel to the second direction D2 in the first direction D1.

The first and second sub-shielding electrodes SHE1 and SHE2 include the same material as that of the shielding electrode SHE. That is, the first and second sub-shielding electrodes SHE1 and SHE2 include a transparent conductive material.

A black matrix BM is disposed in a predetermined area of the first boundary area BA1. In detail, the black matrix BM is disposed between the first sub-shielding electrode SHE1 and the second sub-shielding electrode SHE2 in the first boundary area BA1. That is, the first and second sub-shielding electrodes SHE1 and SHE2 are spaced apart from each other while the black matrix BM is disposed between the first and second sub-shielding electrodes SHE1 and SHE2.

The first and second sub-shielding electrodes SHE1 and SHE2 and the black matrix BM block the light in the first boundary area BA1.

Figure 3:
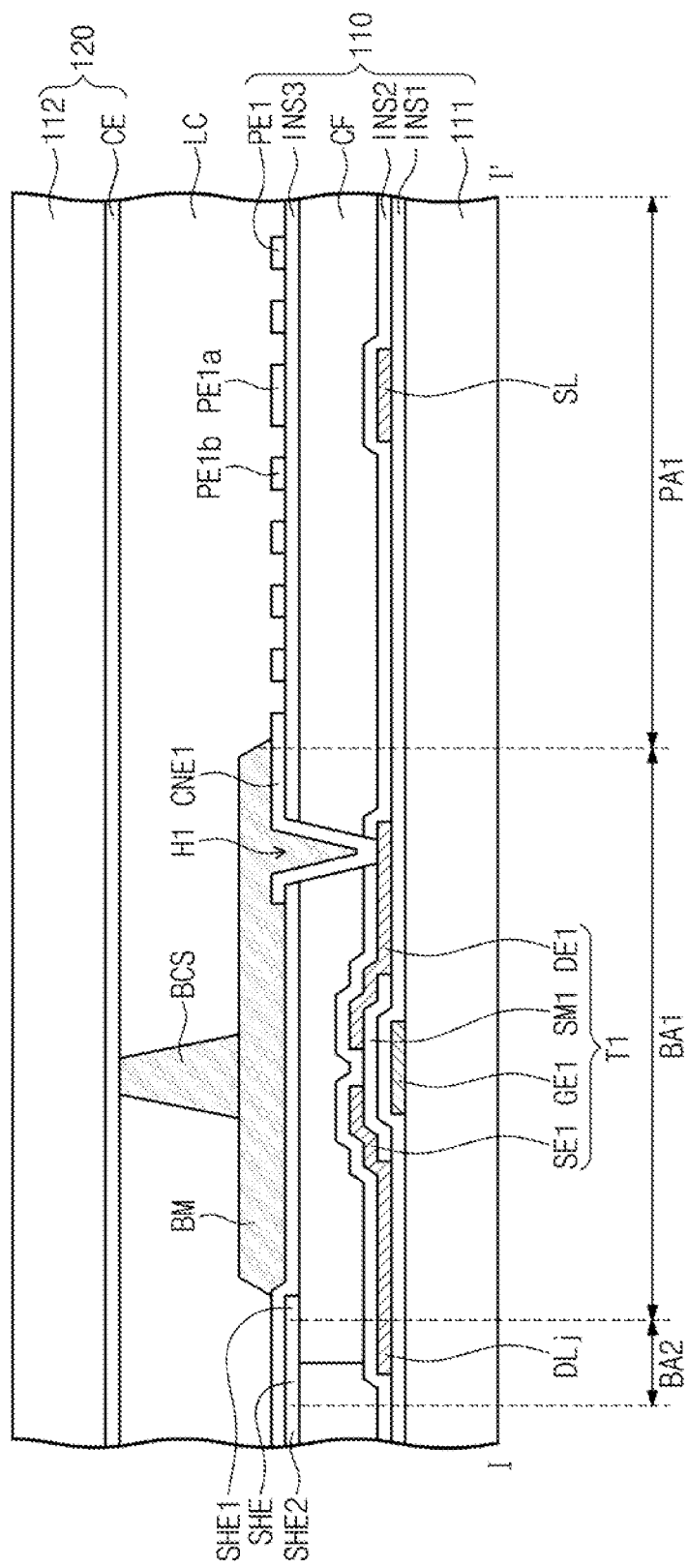
FIG. 3 is a cross-sectional view taken along a line I-I' shown in FIG. 2.
Figure 4:
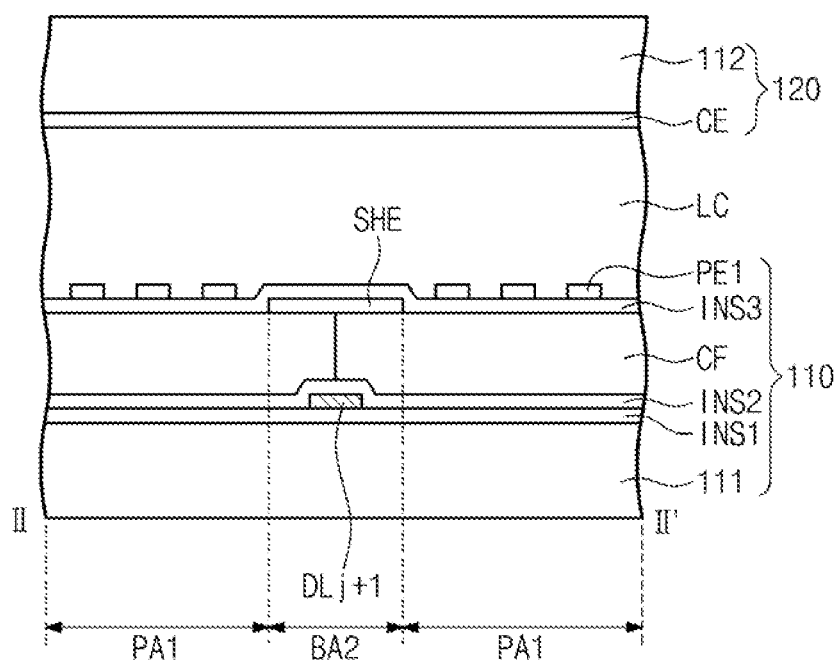
FIG. 4 is a cross-sectional view taken along a line II-II' shown in FIG. 2.
Figure 5:
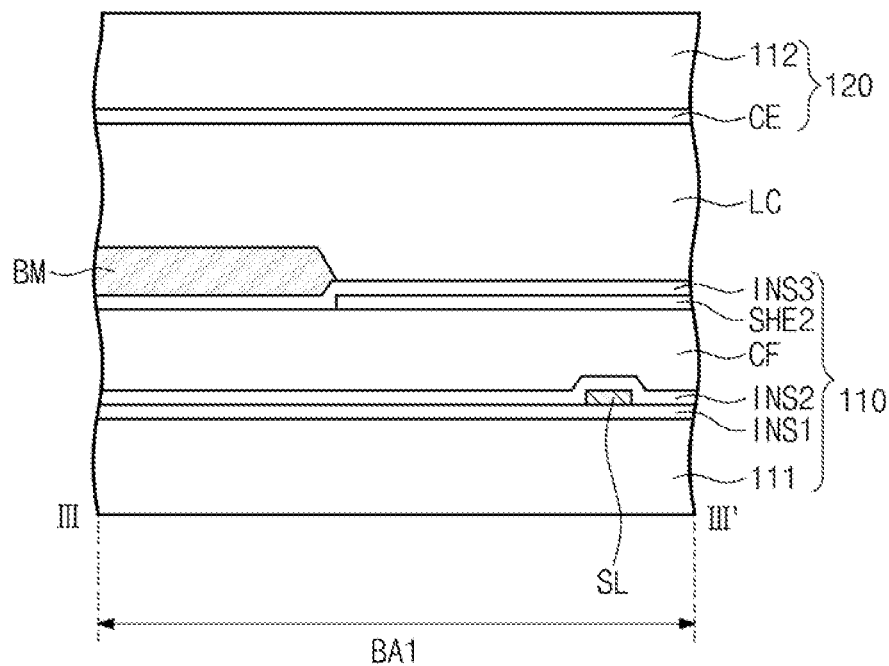
FIG. 5 is a cross-sectional view taken along a line III-III' shown in FIG. 2.

FIG. 3 is a cross-sectional view taken along a line I-I' shown in FIG. 2, FIG. 4 is a cross-sectional view taken along a shown II-II' FIG. 2, and FIG. 5 is a cross-sectional view taken along a line III-III' shown in FIG. 2.

Referring to FIGS. 3, 4, and 5, the pixel PXij includes a first substrate 110, a second substrate 120 facing the first substrate 110, and a liquid crystal layer LC disposed between the first substrate 110 and the second substrate 120.

The first substrate 110 includes a first base substrate 111, the first transistor T1, the color filter CF, the shielding electrode SHE, the first pixel electrode PE1, and the black matrix BM, which are disposed on the first base substrate 111.

The second and third transistors T2 and T3 have the same cross section as that of the first transistor T1. Thus, hereinafter, only the first transistor T1 will be described in detail.

The first gate electrode GE1 of the first transistor T1 is disposed on the first base substrate 111. The first base substrate 111 may be a transparent or non-transparent insulating substrate. For instance, the first base substrate 111 may be as silicon substrate, a glass substrate, or a plastic substrate.

A first insulating layer INS1 is disposed on the first base substrate 111 to cover the first gate electrode GE1. The first insulating layer INS1 may be referred to as a gate insulating layer. The first insulating layer INS1 may be, but not limited to, an inorganic insulating layer including an inorganic material.

A first semiconductor layer SM1 of the first transistor T1 is disposed on the first insulating layer INS1 that covers the first gate electrode GE1. Although not shown in figures, the first semiconductor layer SM1 may include an active layer and an ohmic contact layer.

In the second boundary area BA2, the data lines DLj and DLj+1 are disposed on the first insulating, layer INS1. In the first pixel area PA1, the storage line SL is disposed on the first insulating layer INS1 to overlap with the first trunk portion PE1a of the first pixel electrode PE1.

The first source electrode SE1 and the first drain electrode DE1 of the first transistor T1 are disposed on the first semiconductor layer SM1 and the first insulating layer INS1 and spaced apart from each other. The first semiconductor layer SM1 forms a conductive channel between the first source electrode SE1 and the first drain electrode DE1.

A second insulating layer INS2 is disposed on the first insulating layer INS1 to cover the first transistor T1, the data lines DLj and DLj+1, and the storage line SL. The second insulating layer INS2 may be referred to as a passivation layer. The second insulating layer INS2 may be, but not limited to, an inorganic insulating layer including an inorganic material. The second insulating layer INS2 covers an exposed upper surface of the first semiconductor layer SM1.

The color filters CF are disposed on the second insulating layer INS2. As described above, the color filters CE extend in the second direction D2 to overlap with the first and second pixel areas PA1 and PA2 arranged in the second direction D2. As shown in figures, the color filters CF may be disposed to make contact with each other in the second boundary area BA2.

Each of the color filters CF assigns a color to the light transmitting through the pixel. Each of the color filters CF is a red color filter, a green color filter, or a blue color filter. The red, green, and blue color filters are sequentially arranged in the first direction D1.

The shielding electrode SHE is disposed on the color filter CF in the second boundary area BA2. The width of the shielding electrode SHE is greater than the width of each of the data lines DLj and DLj+1 and the shielding electrode SHE is disposed to overlap with the second boundary area BA2.

The first and second sub-shielding electrodes SHE1 and SHE2 branched from the shielding electrode SHE are disposed on the color filter CF in the first boundary area BA1.

A third insulating layer INS3 is disposed on the color filter CF to cover the shielding electrode SHE and the first and second sub-shielding electrodes SHE1 and SHE2.

The first contact hole H1 is formed through the third insulating layer INS3, the color filter CF, and the second insulating layer INS2 to extend to and expose a predetermined area of the first drain electrode DE1. The first pixel electrode PE1 is disposed on the third insulating layer INS3 in the first pixel area PA1. The first connection electrode CNE1 branched from the first pixel electrode PE1 is electrically connected to the first drain electrode DE1 of the first transistor T1.

The black matrix BM is disposed on the third insulating layer INS3 in the first boundary area BA1 between the first and second sub-shielding electrodes SHE1 and SHE2. In detail, as shown in FIGS. 3 and 5, the black matrix BM is disposed on the third insulating layer INS3 in the first boundary area BA1 in which the first and second sub-shielding electrodes SHE1 and SHE2 are not disposed.

The black matrix BM blocks unnecessary light in the first boundary area BA1 between the first and second sub-shielding electrodes SHE1 and SHE2. In addition, the black matrix BM prevents light leakage caused by malfunction of the liquid crystal molecules in edges of the first and second pixel areas PA1 and PA2 adjacent to the first boundary area BA1 between the first and second sub-shielding electrodes SHE1 and SHE2.

Although not shown in the cross-sectional views, the black matrix BM may be disposed in the third boundary area BA3. Accordingly, the black matrix BM may block the unnecessary light in the third boundary area BA3.

A black column spacer BCS is disposed on the black matrix BM. The black column spacer BCS is disposed to overlap with the conductive channel formed by the first semiconductor layer SM1 of the first transistor T1.

FIG. 3 shows only the cross-sectional view of the first transistor T1, but the black column spacer BCS is disposed to overlap with the conductive channel formed by a second semiconductor layer of the second transistor T2. That is, the black column spacer BCS has a size enough to overlap with the conductive channels of the first and second transistors T1 and T2 and is disposed to overlap with the conductive channels of the first and second transistors T1 and T2.

The black column spacer BCS may be substantially simultaneously formed with the black matrix BM using the same material. Therefore, the black column spacer BCS may block the light together with the black matrix BM. In addition, the black column spacer BCS maintains a cell gap corresponding to a distance between the first substrate 110 and the second substrate 120.

The second substrate 120 includes the second base substrate 112 and the common electrode CE disposed on a lower surface of the second base substrate 112 to face the pixel electrodes PE1, PE2. The second base substrate 112 may be a transparent or non-transparent insulating substrate.

The common electrode CE includes a transparent conductive material, e.g., indium tin oxide, indium zinc oxide, indium tin zinc oxide, etc.

Although not shown in figures, a backlight unit is disposed under the display panel 100 to supply the light to the display panel 100.

The data voltage is applied to the first pixel electrode PE1 through the first transistor T1. The common voltage is applied to the common electrode CE. An electric field is formed between the first pixel electrode PE1 and the common electrode CE due to a difference in voltage between the data voltage and the common voltage.

The liquid crystal molecules of the liquid crystal layer LC are driven by the electric field formed between the first pixel electrode PE1 and the common electrode CE. A transmittance of the light passing through the liquid crystal layer LC is controlled by the liquid crystal molecules driven in response to the electric field, and thus a desired image is displayed.

The drive of the first and second sub-pixels of the pixel PXij will be described with reference to FIG. 6.

The common electrode CE, the shielding electrode SHE, and the first and second sub-shielding electrodes SHE1 and SHE2 are applied with the common voltage. That is, the common electrode CE, the shielding electrode SHE and the first and second sub-shielding electrodes SHE1 and SHE2 receive the same voltage.

Therefore, the electric field is not formed between the shielding electrode SHE and the common electrode CE in the second boundary area BA2. In addition, the electric field is not formed between the common electrode and the first and second sub-shielding electrodes SHE1 and SHE2 in the first boundary area BA1 in which the first and second sub-shielding electrodes SHE1 and SHE2 are disposed.

Since the electric field is not formed in the second boundary area BA2 and the first boundary area BA1 in which the first and second sub-shielding electrodes SHE1 and SHE2 are disposed, the liquid crystal molecules of the liquid crystal layer LC are not driven. In this case, the light may not transmit through the liquid crystal molecules.

Thus, the light is blocked by the shielding electrode SHE in the second boundary area BA2. In addition, the light is blocked by the first and second sub-shielding electrodes SHE1 and SHE2 in the first boundary area BA1 in which the first and second sub-shielding electrodes SHE1 and SHE2 are disposed. In the first boundary area BA1 in which the first and second sub-shielding electrodes SHE1 and SHE2 are not disposed, the light is blocked by the black matrix BM.

In a conventional display apparatus, the black matrix BM is disposed in the first and second boundary areas BA1 and BA2 to block the light passing through the first and second boundary areas BA1 and BA2. In this case, ionic materials generated from the black matrix BM may enter the liquid crystal layer LC by the electric field generated between the first pixel electrode PE1 and the common electrode CE. The ionic materials may disturb the movement of the liquid crystal molecules of the liquid crystal layer LC.

Accordingly, although the data voltage and the common voltage are respectively applied to the first pixel electrode PE1 and the common electrode CE, the liquid crystal molecules may be abnormally driven by the ionic materials. The liquid crystal molecules disposed between the second pixel electrode PE2 and the common electrode CE may be abnormally driven by the ionic materials. In this case, since an image displayed during a previously frame remains as an afterimage, the reliability in display of the display apparatus is deteriorated.

In the display apparatus 500 according to the first exemplary embodiment of the present disclosure, the black matrix BM is not disposed in the second boundary area BA2. In addition, the first and second sub-shielding electrodes SHE1 and SHE2 are disposed in the predetermined area of the first boundary area BA1. That is, the black matrix BM is disposed in the first boundary area BA1 in which the first and second sub-shielding electrodes SHE1 and SHE2 are not disposed.

Since the area in which the black matrix BM is disposed is reduced, an amount of the ionic materials generated from the black matrix BM may be reduced. When the amount of the ionic materials is reduced, the liquid crystal molecules may be normally driven compared to that of the conventional display apparatus. As a result, the display reliability of the display apparatus 500 may be improved.

Consequently, the area for the black matrix BM is reduced in the display apparatus 500, and thus the display reliability of the display apparatus 500 may be improved.

Figure 6:
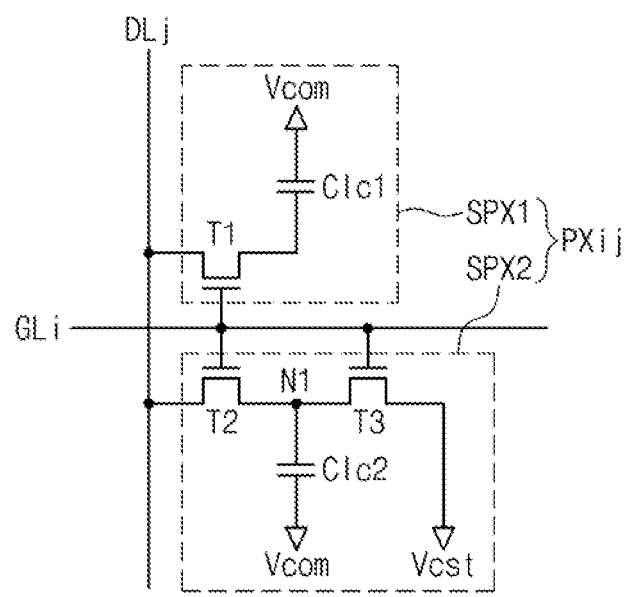
FIG. 6 is an equivalent circuit diagram of the pixel shown in FIG. 2.

FIG. 6 is an equivalent circuit diagram of the pixel shown in FIG. 2.

Referring to FIG. 6, the pixel PXij includes the first sub-pixel SPX1 and the second sub-pixel SPX2.

The first sub-pixel SPX1 includes the first transistor T1 and a first liquid crystal capacitor Clc1. The first transistor T1 includes the first gate electrode GE1 connected to the corresponding gate line GLi, the first source electrode SE1 connected to the corresponding data line DLj, and the first drain electrode DE1 connected to the first liquid crystal capacitor Clc1.

As described above, the first drain electrode DE1 of the first transistor T1 is connected to the first pixel electrode PE1. The first liquid crystal capacitor Clc1 is formed by the first pixel electrode PE1, the common electrode CE, and the liquid crystal layer LC disposed between the first pixel electrode PE1 and the common electrode CE.

The second sub-pixel SPX2 includes the second transistor T2, the third transistor T3, and a second liquid crystal capacitor Clc2. The second transistor T2 includes the second gate electrode GE2 connected to the corresponding gate line GLi, the second source electrode SE2 connected to the corresponding data line DLj, and the second drain electrode DE2 connected to the second liquid crystal capacitor Clc2.

As described above, the second drain electrode DE2 of the second transistor T2 is connected to the second pixel electrode PE2. The second liquid crystal capacitor Clc2 is formed by the second pixel electrode PE2, the common electrode CE, and the liquid crystal layer LC disposed between the second pixel electrode PE2 and the common electrode CE.

The third transistor T3 includes the third gate electrode GE3 connected to the corresponding gate line GLi, the third source electrode SE3 applied with a storage voltage Vcst, and the third drain electrode DE3 commonly connected to the second liquid crystal capacitor Clc2 with the second drain electrode DE2 of the second transistor T2.

As described above, the thud drain electrode DE3 of the thud transistor T3 is connected to the second pixel electrode PE2 as the second drain electrode DE2. In addition, the third source electrode SE3 is branched from the storage line SL. The storage line SL receives the storage voltage Vcst.

The first, second, and third transistors T1, T2, and 13 are turned on in response to the gate signal provided through the gate line GLi. The data voltage is applied to the first sub-pixel SPX1 through the turned-on first transistor T1. In detail, the data voltage provided through the data line DLj is applied to the first pixel electrode PE1 of the first sub-pixel SPX1 through the turned-on first transistor T1.

The first liquid crystal capacitor Clc1 is charged with a first pixel voltage corresponding to the data voltage. In detail, the first pixel voltage corresponding to the difference in level between the data voltage applied to the first pixel electrode PE1 and the common voltage Vcom applied to the common electrode CE is charged in the first liquid crystal capacitor Clc1. According y, the first sub-pixel SPX1 is charged with the first pixel voltage.

The data voltage is applied to the second sub-pixel SPX2 through the turned-on second transistor T2. In addition, the storage voltage Vest is applied to the second sub-pixel SPX2 through the turned-on third transistor T3.

A range of the voltage level of the data voltage is set to be wider than a range of the voltage level of the storage voltage Vcst. The common voltage Vcom may be set to have an intermediate value of the range of the voltage level of the data voltage. An absolute value of the difference in voltage level between the data voltage and the common voltage Vcom may be set to be greater than an absolute value of the difference in voltage level between the storage voltage Vcst and the common voltage Vcom.

A voltage at a node N1 between the second and third transistors T2 and T3 is obtained by voltage division by a resistance value when the second and third transistors T2 and T3 are turned on. That is, the voltage at the node N1 between the second and third transistors T2 and T3 has an intermediate value between the data voltage provided through the turned-on second transistor T2 and the storage voltage Vest provided through the turned-on third transistor T3.

The voltage at the node N1 between the second and third transistors T2 and T3 is applied to the second pixel electrode PE2. That is, the voltage corresponding to the intermediate value between the data voltage and the storage voltage Vest is applied to the second pixel electrode PE2.

A second pixel voltage corresponding to a difference in voltage level between the voltage applied to the second pixel electrode PE2 and the common voltage Vcom applied to the common electrode CE is charged in the second liquid crystal capacitor Clc2. That is, the second pixel voltage smaller than the first pixel voltage is charged in the second liquid crystal capacitor Clc2. Therefore, the second sub-pixel SPX2 is charged with the second pixel voltage smaller than the first pixel voltage.

When the first and second sub-pixels SPX1 and SPX2 of the pixel PXij are charged with the first and second pixel voltages having different voltage levels, the eyes of viewer who sees the display apparatus 500 recognizes a gray scale level corresponding to the intermediate value between the first and second pixel voltages. In this case, deterioration of a side viewing angle, which is caused by a distortion of at gamma curve below the intermediate gray scale level, may be prevented, and thus a side visibility of the display apparatus 500 may be improved.

Figure 7:
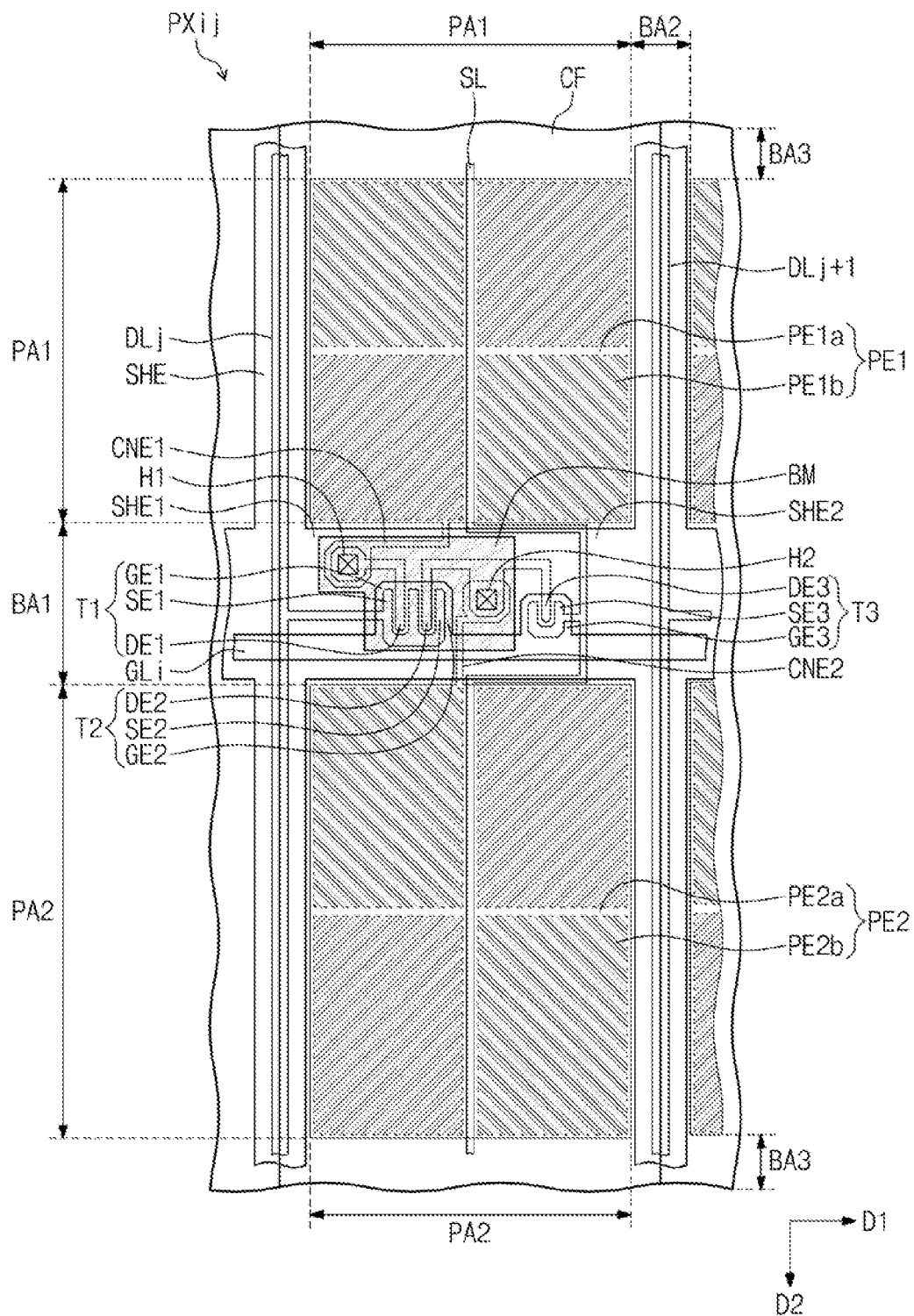
FIG. 7 is a layout diagram showing a display apparatus according to a second exemplary embodiment of the present disclosure.

FIG. 7 is a layout diagram showing a display apparatus according to a second exemplary embodiment of the present disclosure.

The pixel PXij shown in FIG. 7 have the same structure and function as those of the pixel PXij shown in FIG. 2 except for the black matrix BM and the first and second sub-shielding electrodes SHE1 and SHE2. Accordingly, the same elements will be assigned with the same reference numerals, and the following description will be focused on the different parts from those of the pixel PXij shown in FIG. 2.

Referring to FIG. 7, first and second sub-shielding electrodes SHE1 and SHE2 branched from the shielding electrode SHE in the first direction D1 are disposed in a predetermined area of the first boundary area BA1.

The first and second sub-shielding electrodes SHE1 and SHE2 extend in the first boundary area BA1 not to overlap with first and second contact holes H1 and H2 and first and second transistors T1 and T2.

The first and second transistors T1 and T2 include first and second drain electrodes DE1 and DE2 extending to be connected to the first and second contact holes H1 and H2. That is, first and second sub-shielding electrodes SHE1 and SHE2 do not overlap with the first and second drain electrodes DE1 and DE2 extending to be connected to the first and second contact holes H1 and H2.

As shown in FIG. 7, the first sub-shielding electrode SHE1 extends and is connected to the second sub-shielding electrode SHE2 adjacent thereto.

The black matrix BM is disposed in the first boundary area BA1 in which the first and second sub-shielding electrodes SHE1 and SHE2 are not disposed, in detail, the black matrix BM is disposed in the first boundary area BA1 to overlap with the first contact hole H1, the second contact hole H2, the first transistor T1, and the second transistor T2.

As described above, the first and second transistors T1 and T2 include the first and second drain electrodes DE1 and DE2 extending to be connected to the first and second contact holes H1 and H2. That is, the black matrix BM is disposed to overlap with the first and second drain electrodes DE1 and DE2 that extend to be connected to the first and second contact holes H1 and H2.

The shielding electrode SHE blocks the light in the second boundary area BA2. In addition, the black matrix BM and the first and second sub-shielding electrodes SHE1 and SHE2 block the light in the first boundary area BA1.

The black matrix BM of the display apparatus according to the second exemplary embodiment is not disposed in the second boundary area BA2. In addition, the first and second sub-shielding electrodes SHE1 and SHE2 are disposed in the predetermined area of the first boundary area BA1. That is, the black matrix BM is disposed in the first boundary area BA1 in which the first and second sub-shielding electrodes SHE1 and SHE2 are not disposed.

Since the area in which the black matrix BM is disposed is reduced, an amount of the ionic materials generated from the black matrix BM may be reduced. When the amount of the ionic materials is reduced, the liquid crystal molecules may be normally driven compared to that of the conventional display apparatus. As a result, the display reliability of the display apparatus may be improved.

Consequently, the area for the black matrix BM is reduced in the display apparatus, and thus the display reliability of the display apparatus may be improved.

Figure 8:
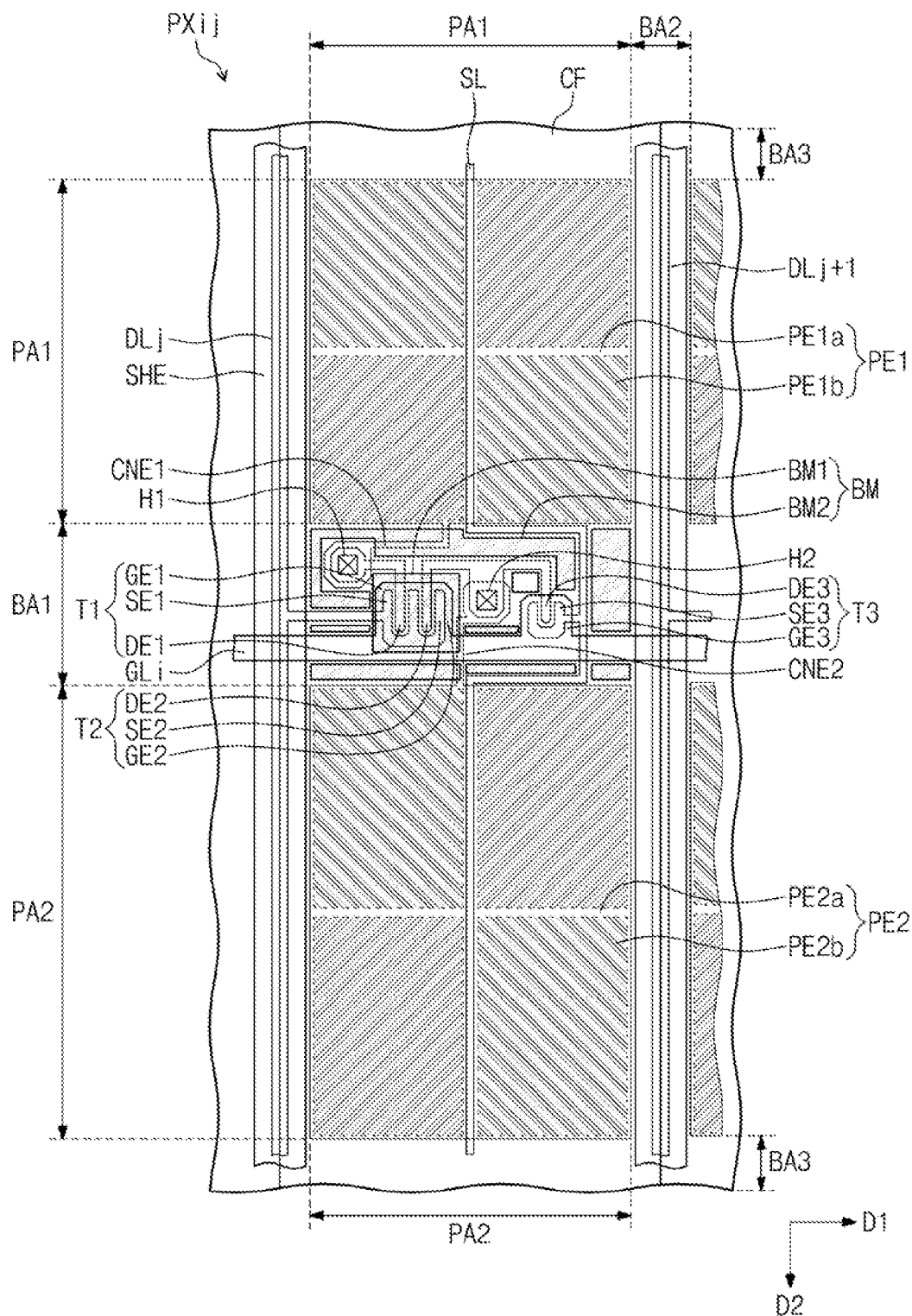
FIG. 8 is a layout diagram showing a display apparatus according to a third exemplary embodiment of the present disclosure.

FIG. 8 is a layout diagram showing a display apparatus according to a third exemplary embodiment of the present disclosure.

The pixel PXij shown in FIG. 8 have the same structure and function as those of the pixel PXij shown in FIG. 2 except for the black matrix BM and the shielding electrodes SHE. Accordingly, the same elements will be assigned with the same reference numerals, and the following description will be focused on the different parts from those of the pixel PXij shown in FIG. 2.

Referring to FIG. 8, the shielding electrode SHE extends in the second direction D2 and is disposed in the second boundary area BA2. The pixel PXij according to the third exemplary embodiment does not include the first sub-shielding electrode SHE and the second sub-shielding electrode SHE2, which is different from the pixel PXij shown in FIG. 2.

The black matrix BM is selectively disposed in a predetermined area of the first boundary area BA1. In detail, the black matrix SM includes a first black matrix BM1 and a plurality of second black matrices BM2.

The black column spacer BCS is disposed on the first black matrix BM1. As described above, the black column spacer BCS is disposed to overlap the conductive channels of the first and second transistors T1 and T2, and the cell gap between the first substrate 110 and the second substrate 120 is maintained by the black column spacer BCS.

The first black matrix BM1, which is formed of the same material as the black column spacer BCS, is disposed to overlap with the first and second transistors T1 and T2 in the first boundary area BA1. In addition, the first black matrix BM1 extends to be adjacent to the first and second drain electrodes DE1 and DE2 that overlap with the first and second contact holes H1 and H2.

The second black matrices BM2 are disposed in the first boundary area BA1 not to overlap with the gate line GLi, the data lines of DLj and DLj+1, the first, second, and third gate electrodes GE1, GE2, and GE3, the first, second, and third source electrodes SE1, SE2, and SE3, and the first, second, and third drain electrodes DE1, DE2, and DE3.

The gate line GLi and the first, second, and third gate electrodes GE1, GE2, and GE3 are substantially simultaneously formed with the same metal material. The gate line GLi and the first, second, and third gate electrodes GE1, GE2, and GE3 may be defined as a gate metal.

The data lines DLj and DLj+1, the first, second, and third source electrodes SE1, SE2, and SE3, and the first, second, and third drain electrodes DE1, DE2, and DE3 are substantially simultaneously formed with the same metal material. The data lines DLj and DLj+1, the first, second, and third source electrodes SE1, SE2, and SE3, and the first, second, and third drain electrodes DE1, DE2, and DE3 may be defined as a source-drain metal.

Therefore, the second black matrices BM2 are disposed in areas of the first boundary area BA1, in which the gate metal and the source-drain metal are not disposed.

The gate metal and the source-dram metal may include a low reflectivity metal material and block the light provided from the backlight unit. For instance, the gate metal and the source-drain metal include chromium having lower reflectivity than that of aluminum and copper to block the light.

The shielding electrode SHE blocks the light in the second boundary area BA2. In addition, the first and second black matrices BM1 and BM2, the gate metal, and the source-drain metal block the light in the first boundary area BA1.

The first and second black matrices BM1 and BM2 of the display apparatus according to the third exemplary embodiment are not disposed in the second boundary area BA2. In addition, the first and second black matrices BM1 and BM2 are selectively disposed in the predetermined area of the first boundary area BA1.

Since the area in which the black matrix BM is disposed is reduced, an amount of the ionic materials generated from the black matrix BM may be reduced. When the amount of the ionic materials is reduced, the liquid crystal molecules may be normally driven compared to that of the conventional display apparatus. As to result, the display reliability of the display apparatus may be improved.

Consequently, the area for the black matrix BM is reduced in the display apparatus, and thus the display reliability of the display apparatus may be improved.

Although the exemplary embodiments have been described, it is understood that the inventive concept should not be limited to these exemplary embodiments but various changes and modifications can be made by one ordinary skilled in the art within the spirit and scope of the inventive concept a hereinafter claimed.

What is claimed is:

1. A display apparatus comprising:
a display panel that includes gate lines, data lines, and pixels connected to the gate lines and the data lines, each pixel comprising:
a first pixel electrode disposed in a first pixel area;
a second pixel electrode disposed in a second pixel area;
a shielding electrode disposed between first pixel areas and between second pixel areas, which are arranged in a first direction, and extending in a second direction crossing the first direction;
a first sub-shielding electrode branching from the shielding electrode along the first direction and disposed in a first area of a first boundary area between the first pixel area and the second pixel area;
a second sub-shielding electrode branching from the shielding electrode along the first direction and disposed in a second area of the first boundary area spaced apart from the first area of the first boundary area; and
a black matrix disposed in a third area of the first boundary area between the first area and the second area, the black matrix not overlapping the first area of the first boundary area and the second area of the first boundary area.

2. The display apparatus of claim 1, wherein each of the data lines is disposed in a second boundary area in which the shielding electrode is disposed and the shielding electrode has a width greater than a width of each of the data lines in the second direction.

3. The display apparatus of claim 1, wherein each of the pixels further comprises:

a first transistor connected to a corresponding gate line of the gate lines, a corresponding data line of the data lines, and the first pixel electrode;
a second transistor connected to the corresponding gate line, the corresponding data line, and the second pixel electrode; and
a third transistor connected to the corresponding gate line, the second pixel electrode, and a storage line disposed on a same layer as the corresponding data line, and the first, second, and third transistors are disposed in the first boundary area.

4. The display apparatus of claim 3, wherein the display panel comprises:
a plurality of color filters disposed on the first, second, and third transistors and extending in the second direction to overlap with the first and second pixel areas; and
an insulating layer disposed on the shielding electrode and the first and second sub-shielding electrodes, the shielding electrode and the first and second sub-shielding electrodes are disposed on the color filters, and the first and second pixel electrodes and the black matrix are disposed on the insulating layer.

5. The display apparatus of claim 4, wherein the first transistor comprises:
a first gate electrode branched from the corresponding gate line;
a first source electrode branched from the corresponding data line; and
a first drain electrode connected to a first connection electrode branched from the first pixel electrode through a first contact hole formed through the insulating layer and the color filter, the first sub-shielding electrode extends to be adjacent to the first contact hole and is disposed not to overlap with the first connection electrode, and an end of the first sub-shielding electrode in the first direction is substantially parallel to the second direction.

6. The display apparatus of claim 4, wherein the second transistor comprises:
a second gate electrode branched from the corresponding gate line;
a second source electrode branched from the corresponding data line; and
a second drain electrode connected to a second connection electrode branched from the second pixel electrode through a second contact hole formed through the insulating layer and the color filter, the second sub-shielding electrode extends to be adjacent to the second contact hole and is disposed not to overlap with the second connection electrode, and an end of the second sub-shielding electrode in the first direction is substantially parallel to the second direction.

7. The display apparatus of claim 6, wherein the storage line extends in the second direction to overlap with a center portion of the first pixel electrode and a center portion of the second pixel electrode, and extends in the second direction in the first boundary area after extending in the second direction in a boundary between the first pixel area and the first boundary area and in a boundary between the second pixel area and the first boundary area by a predetermined length.

8. The display apparatus of claim 7, wherein the third transistor comprises:
a third gate electrode branched from the corresponding gate line;
a third source electrode branched from the storage line; and a third drain electrode connected to the second pixel electrode through the second contact hole.

9. The display apparatus of claim 4, wherein the first transistor is connected to the first pixel electrode through a first contact hole formed through the insulating layer and the color filter, and the second transistor is connected to the second pixel electrode through a second contact hole formed through the insulating layer and the color filter.

10. The display apparatus of claim 9, wherein the first and second sub-shielding electrodes extend not to overlap with the first and second contact holes and the first and second transistors, and the first sub-shielding electrode is connected to the second sub-shielding electrode adjacent to the first sub-shielding electrode.

11. The display apparatus of claim 10, wherein the black matrix is disposed to overlap with the first and second contact holes and the first and second transistors.

12. The display apparatus of claim 1, wherein the first and second pixel electrodes, the shielding electrode, and the first and second sub-shielding electrodes comprise a transparent conductive material.

13. The display apparatus of claim 1, wherein each of the first and second pixel electrodes comprises:
a trunk portion having a cross shape to divide each of the first and second pixel areas into plural domains; and
a plurality of branch portions protruded from the trunk portion in a radial form, the branch portions extending in different direction in the domains, extending substantially in parallel to each other in each domain, and being spaced apart from each other.

14. The display apparatus of claim 1, wherein the display panel comprises:
a first substrate that includes the pixels;
a second substrate facing the first substrate and including a common electrode; and
a liquid crystal layer disposed between the first substrate and the second substrate, and the shielding electrode, the common electrode, and the first and second sub-shielding electrodes receive a same voltage.

15. A display apparatus comprising:
a display panel that includes gate lines, data lines, and pixels connected to the gate lines and the data lines, each pixel comprising:
a first pixel electrode disposed in a first pixel area;
a second pixel electrode disposed in a second pixel area;
a first transistor connected to a corresponding gate line of the gate lines, a corresponding data line of the data lines, and the first pixel electrode;
a second transistor connected to the corresponding gate line, the corresponding data line, and the second pixel electrode;
a third transistor connected to the corresponding gate line, the second pixel electrode, and a storage line disposed on a same layer as the corresponding data line;
a shielding electrode disposed between first pixel areas and between second pixel areas, which are arranged in a first direction, and extending in a second direction crossing the first direction; and
a black matrix comprising a first black matrix disposed in one area of a first boundary area between the first pixel area and the second pixel area, and a plurality of second black matrices disposed in a second area of the first boundary area,
wherein the first black matrix overlaps at least one of the first, second, and third transistors and the second black matrices do not overlap the first, second, and third transistors.

16. The display apparatus of claim 15, wherein:
the first black matrix disposed to overlap with the first and second transistors; and
the second black matrices disposed in the second area, in which a gate metal and a source-drain metal used to form the first, second, and third transistors are not disposed, in the first boundary area.

17. The display apparatus of claim 16, wherein the gate metal and the source-drain metal comprise chromium as a low reflectivity metal material.

18. The display apparatus of claim 15, wherein the display panel comprises:
a plurality of color filters disposed on the first, second, and third transistors and extending in the second direction to overlap with the first and second pixel areas; and
an insulating layer disposed on the shielding electrode, the color filters are disposed on the shielding electrode, and the first and second pixel electrodes and the black matrix are disposed on the insulating layer.

19. The display apparatus of claim 18, wherein the first transistor comprises:
a first gate electrode branched from the corresponding gate line;
a first source electrode branched from the corresponding data line; and
a first drain electrode connected to the first pixel electrode through a first contact hole formed through the insulating layer and the color filter, the second transistor comprises:
a second gate electrode branched from the corresponding gate line;
a second source electrode branched from the corresponding data line; and
a second drain electrode connected to the second pixel electrode through a second contact hole formed through the insulating layer and the color filter, and the black matrix extends to be adjacent to the first and second drain electrodes overlapped with the first and second contact holes.

20. The display apparatus of claim 19, wherein the third transistor comprises:
a third gate electrode branched from the corresponding gate line;
a third source electrode branched from the storage line; and
a third drain electrode connected to the second pixel electrode through the second contact hole.

* * * * *